US008001163B2

(12) United States Patent  
Kawamura

(10) Patent No.: US 8,001,163 B2  
(45) Date of Patent: Aug. 16, 2011

(54) DATABASE MANAGEMENT SYSTEM FOR CONTROLLING POWER CONSUMPTION OF STORAGE SYSTEM

(75) Inventor: Nobuo Kawamura, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 331 days.

(21) Appl. No.: 12/007,546

(22) Filed: Jan. 11, 2008

(65) Prior Publication Data

US 2008/0172424 A1 Jul. 17, 2008

(30) Foreign Application Priority Data

Jun. 1, 2007 (JP) ................................ 2007-146532

(51) Int. Cl.
*G06F 17/30* (2006.01)

(52) U.S. Cl. ........ 707/812; 707/661; 707/741; 707/769; 707/827

(58) Field of Classification Search .................. 707/661, 707/741, 769, 812, 827; 711/161
See application file for complete search history.

(56) References Cited

U.S. PATENT DOCUMENTS

| | | | | |
|---|---|---|---|---|
| 4,570,217 A | * | 2/1986 | Allen et al. | 700/83 |
| 7,251,747 B1 | * | 7/2007 | Bean et al. | 714/18 |
| 7,421,552 B2 | * | 9/2008 | Long | 711/162 |
| 7,441,061 B2 | * | 10/2008 | Gilligan | 710/300 |
| 7,512,834 B2 | * | 3/2009 | Ranson et al. | 714/6 |
| 2004/0243610 A1 | * | 12/2004 | Ishiguro et al. | 707/100 |
| 2005/0111249 A1 | | 5/2005 | Yagisawa et al. | |
| 2006/0020885 A1 | * | 1/2006 | Sridharan | 715/517 |
| 2007/0174302 A1 | * | 7/2007 | Ishiguro et al. | 707/10 |
| 2007/0220227 A1 | * | 9/2007 | Long | 711/165 |
| 2007/0245165 A1 | * | 10/2007 | Fung | 713/320 |
| 2008/0172424 A1 | * | 7/2008 | Kawamura | 707/204 |
| 2010/0250549 A1 | * | 9/2010 | Muller et al. | 707/741 |
| 2010/0257140 A1 | * | 10/2010 | Davis et al. | 707/661 |

FOREIGN PATENT DOCUMENTS

JP 2005-157710 11/2003

* cited by examiner

*Primary Examiner* — Jean M Corrielus  
(74) *Attorney, Agent, or Firm* — Volpe and Koenig, P.C.

(57) ABSTRACT

When performing access relating to a first type storage device among a plurality of storage devices in the storage system, the database management system specifies a second type storage device that stores a backup of data that are stored in the first type storage device if an error relating to the access is detected and issues a power conservation cancellation instruction to cancel the power conservation of the second type storage device.

16 Claims, 13 Drawing Sheets

FIG. 4

DB DISK MAPPING TABLE 1216

| DB STORAGE AREA NAME 12161 | FILE NAME 12162 | TYPE 12163 | STORAGE SYSTEM ID 12164 | LU ID(LUN) 12165 | POWER CONSUMPTION STATE 12166 |
|---|---|---|---|---|---|
| DB AREA1 | /DB /DB1 | DB | CTL#A1 | LU#1 | ON |
| DB AREA2 | /DB /DB2 | DB | CTL#A1 | LU#2 | ON |
| LOG1 | /DB /LOG1 | LOG | CTL#A1 | LU#3 | ON |
| LOG2 | /DB /LOG2 | LOG | CTL#A2 | LU#4 | OFF |
| DBAREA1 BACKUP AREA 1 | /DB /BKUPDB1 | BACKUP | CTL#A1 | LU#5 | OFF |
| DBAREA2 BACKUP AREA 2 | /DB /BKUPDB2 | BACKUP | CTL#A1 | LU#6 | OFF |
| LOG ARCHIVE AREA 1 | /DB /BKUPLOG1 | ARCHIVE LOG | CTL#A1 | LU#7 | ON |
| LOG ARCHIVE AREA 2 | /DB /BKUPLOG2 | ARCHIVE LOG | CTL#A1 | LU#8 | OFF |

FIG. 10

DB DISK MAPPING TABLE 1216'

| DB STORAGE AREA NAME | FILE NAME | TYPE | PRIMARY STORAGE ID | PRIMARY LU ID (LUN) | SECONDARY STORAGE SYSTEM ID | SECONDARY LU ID (LUN) | POWER CONSUMPTION STATE |
|---|---|---|---|---|---|---|---|
| DBAREA1 | /DB/DB1 | DB | CTL#A1 | LU#1 | CTL#A1 | LU#11 | ON |
| DBAREA2 | /DB/DB2 | DB | CTL#A1 | LU#2 | CTL#A1 | LU#12 | ON |
| LOG1 | /DB/LOG1 | LOG | CTL#A1 | LU#3 | CTL#A1 | LU#13 | ON |
| LOG2 | /DB/LOG2 | LOG | CTL#A2 | LU#4 | CTL#A2 | LU#14 | OFF |
| LOG ARCHIVE AREA 1 | /DB/BKUPLOG1 | LOG ARCHIVE | CTL#A1 | LU#5 | CTL#A1 | LU#15 | ON |
| LOG ARCHIVE AREA 2 | /DB/BKUPLOG2 | LOG ARCHIVE | CTL#A2 | LU#6 | CTL#A2 | LU#16 | OFF |

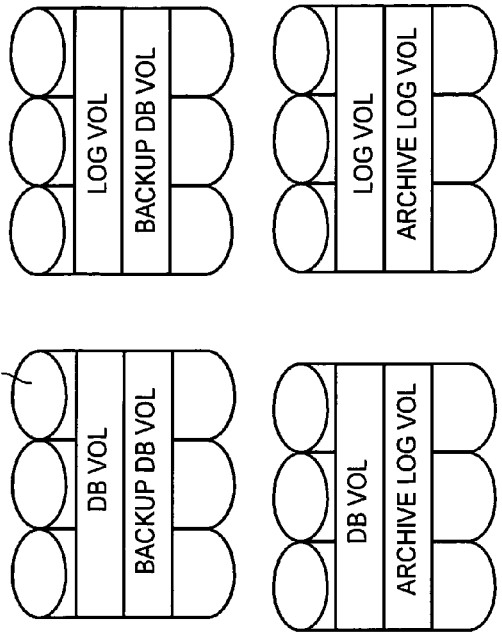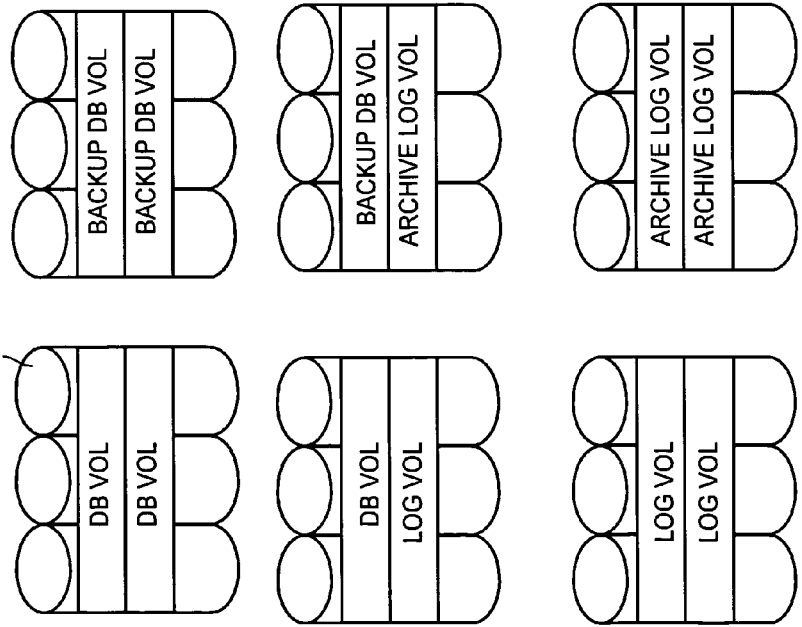

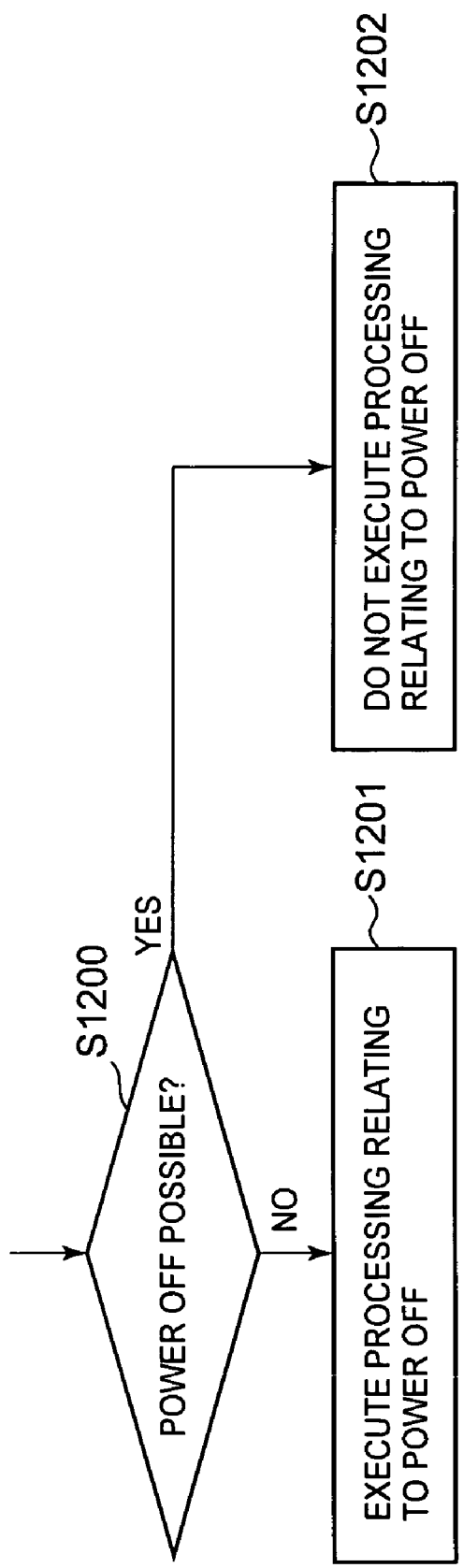

US 8,001,163 B2

DATABASE MANAGEMENT SYSTEM FOR CONTROLLING POWER CONSUMPTION OF STORAGE SYSTEM

CROSS-REFERENCE TO PRIOR APPLICATION

This application relates to and claims the benefit of priority from Japanese Patent Application number 2007-146532 filed on Jun. 1, 2007, the entire disclosure of which is incorporated herein by reference.

BACKGROUND

The present invention generally relates to control of the power consumption of a storage system.

A storage system generally provides a host computer with a storage area of a storage device. The host computer writes data to the storage area provided by the storage system and read data that are stored in the storage area. Recently, because the volume of data handled by storage systems has increased, storage systems have come to comprise a greater number of storage devices. However, when the number of storage devices provided by a storage system is large, the power consumed by the storage system is also large and, therefore, the costs of running the storage system increase.

This problem includes technology disclosed in Japanese Application Laid Open No. 2005-157710, for example. According to Japanese Application Laid Open No. 2005-157710, by permitting the operation of storage devices undergoing data access such as data writing or reading and halting storage devices that are not undergoing data access, the power consumed by the storage system is reduced.

The abovementioned control of the power consumption is implemented as a result of the storage system itself monitoring whether data access is being performed with respect to storage devices that the storage system itself comprises. For example, the storage system turns OFF the power of storage devices for which there has been no data access for a predetermined period and turns ON the power of storage devices which are the subject of data access when data access occurs.

However, using this method, the following problems arise. That is, it normally takes a little while before the storage device can be accessed after the power of the storage device is turned ON. For example, in cases where a hard disk drive (HDD) is utilized as a storage device, because so-called 'spin-up' during which the speed of the hard disk is increased until a speed permitting access is reached after the power of the HDD is turned ON, a time corresponding to the spin-up time is required until access is possible. Therefore, when data access occurs, the storage device cannot be accessed directly even when the power of the storage device which is the subject of this data access is turned ON.

This fact is considered to be a problem particularly when a fault such as one that prevents access to data in a database ('DB' hereinbelow) occurs and the DB is restored from the faulty state.

In other words, although an early restore of the DB from the fault is desirable in cases where the fault above occurs, storage devices ('restore use storage device' hereinbelow) in which data that are used for a restore ('restore use data', hereinbelow) are stored normally have a low access frequency. Therefore, in cases where the above technology is utilized whereby the power of the storage device is turned ON when the storage device is to undergo data access, the power of the restore use storage device is then often turned OFF. For this reason, because, in order to restore the DB at an early stage from the faulty state, the restore use data cannot be read directly from the restore use storage device irrespective of the need to read the restore use data as early as possible, the restore takes a long time.

SUMMARY

Therefore, an object of the present invention is to shorten the time required to restore a database while implementing savings for the power consumption of the storage system.

Upon performing access relating to a first type storage device among a plurality of storage devices in the storage system, the database management system specifies a second type storage device that stores a backup of data that are stored in the first type storage device if an error relating to the access is detected and issues a power conservation cancellation instruction to cancel the power conservation of the second type storage device.

BRIEF DESCRIPTION OF THE DRAWINGS

FIG. 4 shows an example of a DB disk mapping table;

FIG. 10 shows an example of a DB disk mapping table according to the second embodiment;

FIG. 12A shows a combination of LUs of a plurality of types that are permitted to exist in one RAID group according to a third embodiment of the present invention;

FIG. 12B shows a combination of LUs of a plurality of types that are prohibited from existing in one RAID group according to the third embodiment of the present invention; and FIG. 13 shows the flow of processing that is executed in cases where a power OFF instruction is transmitted according to the third embodiment.

DETAILED DESCRIPTION OF THE PREFERRED EMBODIMENTS

Figure 1:
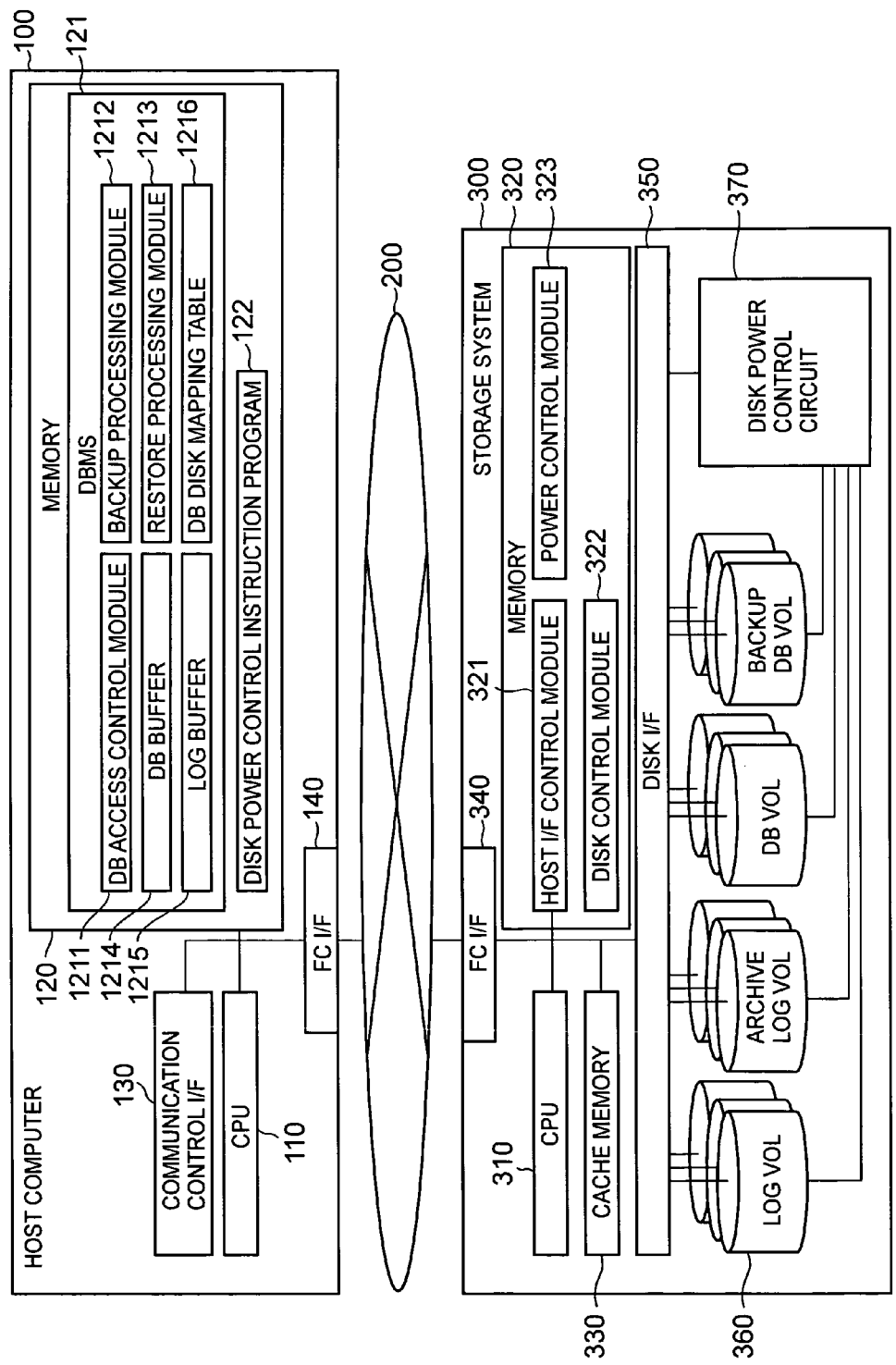
FIG. 1 shows an example of the constitution of the whole system according to a first embodiment of the present invention.

In one embodiment, a database management system that is operated by a computer that is connected to a storage system comprising a plurality of storage devices comprises an access module, a storage device specifying module, and a power consumption control module. The storage system comprises an interface module, a power control module (a combination of a power control circuit that controls the power to each storage device and a computer program that controls the power control circuit, for example). The access module performs access relating to a first type storage device among a plurality of storage devices. The storage device specifying module specifies a second type storage device among a plurality of storage devices that stores backups of data stored in the first type storage device in cases where an error relating to the access is detected. The power consumption control module issues a power conservation cancellation instruction canceling the power conservation of the specified second type storage device. The interface module receives this power conservation cancellation instruction. The power control module cancels the power conservation of the second type storage device designated by the power conservation cancellation instruction. In this embodiment, the second type storage device is in power conservation state and, when a power conservation cancellation instruction is received in this manner, the power conservation is cancelled by the power control module.

Here, 'power conservation of the storage device' signifies that the power of the storage device (if the storage device is a logical storage device, all the physical storage devices constituting this logical storage device) is OFF or the fact that the storage device has entered a power saving state (a state where the disk is rotating at a low speed, for example), for example. The cancellation of the power conservation signifies a transition to a state in which the power of the storage device is put in an ON state or where the power saving state is cancelled and access is possible (a state where the disk is rotating at a high speed, for example).

In an embodiment, the first type storage device includes a DB storage device that stores DB data which are elements constituting a database. The second type storage device includes a backup DB storage device which is the backup destination for the DB data in the DB storage device.

In another embodiment, the first type storage device also includes a log storage device that stores log data representing a log relating to access to the database. The second type storage device also includes an archive log storage device in which an archive of the log data stored in the log storage device are stored.

Instill another embodiment, a plurality of log storage devices are associated with a log buffer that is provided in a storage resource in the computer (memory, for example). A log swap module that executes swap processing is further provided in the database management system. The swap processing includes processing to swap a target log storage device which is the access destination for log data stored in the log buffer from a first log storage device to a second log storage device among the plurality of log storage devices and processing to write the log data stored in the first log storage device to the archive log storage device. The access module is constituted to temporarily store the log data in the log buffer and store the log data which are stored in the log buffer in the target log storage device. The power consumption control module issues a power conservation cancellation instruction to cancel the power conservation of the second log storage device and the archive log storage device before the start of the swap processing.

In a further embodiment, prior to the start of the subsequent swap processing, the power consumption control module issues a power conservation cancellation instruction to cancel power conservation of the storage device which is the second type storage device in the subsequent swap processing following the current swap processing.

In a still further embodiment, the database management system further comprises a backup module that backs up data that are stored in the DB storage device to a backup DB storage device that is selected from the plurality of storage devices. The power consumption control module issues a power conservation cancellation instruction to cancel the power conservation of the backup DB storage device prior to the start of the backup of data from the DB storage device to the backup storage device and issues a power conservation instruction to conserve the power of the backup DB storage device after the backup is complete.

In a still further embodiment, the database management system further comprises a restore module that restores a database utilizing data that are stored in a backup DB storage device that is selected from the plurality of storage devices. The power consumption control module issues a power conservation instruction to conserve the power of the backup DB storage device after a restore that utilizes the data stored in the backup DB storage device is complete.

In a still further embodiment, the selected backup DB storage device data in which data that are read during the restore are stored is a backup DB storage device which constitutes the target of power conservation cancellation using a power conservation cancellation instruction issued by the power consumption control module.

In a still further embodiment, each of the plurality of storage devices is a logical storage device that is formed on a RAID group that is constituted by two or more physical storage devices. The power consumption control module does not issue a power conservation instruction to the backup DB logical storage device if it is not possible to cancel the power conservation of another logical storage device that exists in the RAID group in which the backup DB logical storage device exists.

In a still further embodiment, the first type storage device and second type storage device are not mixed as the two or more storage devices that exist in one RAID group.

Two or more embodiments among the plurality of embodiments above can be combined. In addition, each of the above modules (the access module, the storage device specifying module, the power consumption control module, the backup module, and the restore module, and so forth, for example) can be constructed by hardware, a computer program or a combination thereof (a portion is implemented by a computer program while the remainder is implemented by hardware, for example). A computer program is executed after being read to a predetermined processor. In addition, in the event of information processing that is performed when the computer program is read to the processor, a storage area that exists on a hardware resource such as memory may suitably be used. In addition, a computer program may be installed on a computer from a recording medium such as a CD-ROM or downloaded to a computer via a communication network.

A few embodiments of the present invention will be described in detail hereinbelow with reference to the drawings.

First Embodiment

FIG. 1 shows an example of the constitution of the whole system according to the first embodiment of the present invention.

The host computer 100 and storage system 300 are connected via a communication network (a SAN (Storage Area Network) 200, for example).

The host computer 100 is a computer that controls access to a database (DB) stored by a storage system 300. A client computer (not shown) is able to update and reference the data of the DB via the host computer 100. The host computer 100 can comprise a CPU 110, a storage resource (memory 120, for example) an interface device that is connected to a communication network 200 (FC I/F (Fibre Channel Interface) 140, for example). The storage resource is one of the memory 120 and auxiliary storage device (HDD, for example) or a combination thereof, for example. The memory 120 is able to store a database management system (DBMS) 121 and a disk power control instruction program 122 as computer programs, for example. The CPU 110 is able to read and execute the DBMS 121 and disk power control instruction program 122. Hereinbelow, in order to facilitate understanding of the description, the subject of the processing that is executed as a result of the CPU reading and executing a computer program is sometimes the computer program rather than the CPU.

The DBMS 121 analyzes requests from the client computer (SQL (Structured Query Language), for example) and executes processing that is based on the results of the analysis. The DBMS 121 comprises a DB access control module 1211, a backup processing module 1212, and a restore processing module 1213 as subprograms, for example. The memory 120 of the host computer 100 stores a DB buffer 1214 and a log buffer 1215. In addition, the memory 120 stores the subsequently described DB disk mapping table 1216 (See FIG. 4) for managing mapping and so forth between the DB buffer 1214 and a logical disk.

The DB access control module 1211 executes processing to access the DB (data reading and writing and so forth). For example, in cases where data are written, the DB access control module 1211 stores data constituting the write target ('write data' hereinbelow) in the DB buffer 1214 and creates log data for the access processing and stores same in the log buffer 1215. The write data stored in the DB buffer 1214 are then transferred to the logical unit (LU) 360 which is the write target of the storage system 300 via a predetermined physical or logical environment element (a file system, logical volume, or logical disk, for example). Likewise, log data stored in the log buffer 1215 are then transferred to the LU 360 (LU 360 for storing log data) that corresponds with the storage system 300 via a predetermined physical or logical environment element. The environment constituted by such a physical or logical environment element is sometimes called a 'DB access environment' hereinbelow. Details of the DB access environment will be provided subsequently.

The backup processing module 1212 performs backups of data stored in the disk drive with which the storage system 300 is provided. The backup processing module 1212 is able to back up, as a unit, the LU 360 that is provided by the storage system 300 as a storage area for the host computer 100. More specifically, the backup processing module 1212 reads the data stored in the LU 360 which are the backup target and writes the backup data thus read to the backup LU 360 corresponding to the backup target LU 360. The reading and writing that are performed during the backup, that is, the processing to access the DB, are carried out by the DB access control module 1211 and, when the LU 360 is accessed, the DB access environment is utilized.

The restore processing module 1213 restores data that are stored in the disk device when necessary such as when a fault occurs with the storage system 300. The restore processing module 1213 is able to restore, as a unit, the LU 360 as in the case of a backup and restores the designated data of the LU 360 to data of a predetermined time. More specifically, the restore processing module 1213 reads data from the backup LU 360 or the like and writes the data thus read to the LU 360 which is the restore target. As in the case of a backup, the access processing for access to the DB that is being performed at the time of the restore is also carried out by the DB access control module 1211 and the DB access environment is utilized when the LU 360 is accessed. The details of the processing executed by the programs 1211, 1212, and 1213 will be provided subsequently.

The disk power control instruction program 122 transmits an instruction designating the power consumption state of the designated disk device ('power consumption state instruction' hereinbelow) to a power control module 323 of the storage system 300. Although the LU 360 is designated by the power consumption state instruction in this embodiment, the disk device which is the target of the power consumption state switching may be designated instead. Because the LU 360 is designated by a power consumption state instruction, one or a plurality of disk devices corresponding with the designated LU 360 are the target of the power consumption state switching. Two states such as power ON and power OFF, for example, can be defined as power consumption states. In addition, the states that are defined are not limited to the two states of power ON and power OFF; a variety of power consumption states can also be defined. For example, a normal state and power saving state can also be defined as power consumption states for power ON. A normal state is a state where the disk in the disk device is rotating at a speed permitting access. A power saving state is a state where the speed of a disk in the disk device is lower than the speed of the disk in the normal state. In the following description, two states, namely, power ON and power OFF are defined as the power consumption states. Hence, the power consumption state instructions include two instructions, namely, a power ON instruction and a power OFF instruction.

The storage system 300 is a computer that stores a DB that is accessed by the host computer 100. The storage system 300 comprises a plurality of disk devices and provides the host computer 100 with an LU 360 that is formed as a result of the assignment of part or all of the storage space of one or a plurality of disk devices. The disk devices are devices that read and write data to/from disk-type storage media which are HDD, for example. Another type of physical storage device such as a flash memory drive, for example, may also be adopted in place of a disk device. The LU 360 with which the host computer 100 is provided is formed for each application, for example. In this embodiment, as shown in FIG. 4, the storage system 300 comprises an LU 360 (log VOL) for storing log data, an LU 360 (archive log VOL) for storing log data archives ('archive logs' hereinbelow) an LU 360 (DB VOL) for storing user data (all or part of the DB that the client computer accesses by using the DBMS, and an LU 360 (backup DB VOL) for storing backup data of data that are stored in the DB VOL. A plurality of at least one of these LU (log VOL, archive log VOL, DB VOL, and backup DB VOL) may also be provided.

In addition, the storage system 300 can comprise a CPU 310, a storage resource (memory 320, for example), an interface device (FC I/F 340, for example) that is connected to the communication network 200, a cache memory 330, a disk I/F 350 which is an interface device that is connected to each disk device providing each LU 360, and a power control circuit ('disk power control circuit' hereinbelow) 370 that controls the power consumption state of the disk device. The storage resource is one of the memory 320 and the auxiliary storage device (HDD, for example) or a combination thereof, for example, as in the case of the host computer 100. The memory 320 is able to store a host I/F control module 321, a disk control module 322, and the power control module 323 as computer programs, for example.

The host I/F control module 321 is a computer program that functions as an interface for the host computer 100. The host I/F control module 321 receives access commands and power consumption state instructions from the host computer 100. Upon receiving a power consumption state instruction from the host computer 100, the host I/F control module 321 transfers the power consumption state instruction to the power control module 323. However, upon receiving an access command, the host I/F control module 321 is able to analyze the access command and cause the disk control module 322 to execute access in accordance with the access command. For example, in cases where the access command is a write command, the host I/F control module 321 sends a write instruction for writing write data to an area of the DB VOL that was designated by the write command to the disk control module 322. In addition, in cases where the access command is a read command, the host I/F control module 321 sends a read instruction to read data from the area of the DB VOL that was designated by the read command (the data constituting the read target is called 'read data' hereinbelow) to the disk control module 322.

The disk control module 322 controls access to each LU 360 via the disk I/F 350 in accordance with instructions from the host I/F 321. Upon receipt of a write instruction from the host I/F control module 321, the disk control module 322 writes the designated write data to the designated area of the DB VOL. In addition, upon receipt of a read instruction from the host I/F control module 321, the disk control module 322 reads read data from the designated area of the DB VOL and transfers the read data thus read to the host I/F control module 322. In this case, read data are transmitted from the host I/F control module 322 to the host computer 100.

The power control module 323 is a computer program that controls the disk power control circuit 370 in order to perform switching of the power consumption states of the disk devices that constitute the LU 360 designated by the power consumption state instruction. Upon receipt of a power consumption state instruction from the disk power control instruction program 122, the power control module 323 is able to control the power consumption states of the disk devices corresponding with the LU 360 designated by the power consumption state instruction. For example, if the power consumption state instruction is a power ON instruction designating a certain DB VOL, the power control module 323 instructs the disk power control circuit 370 to turn ON the power of the disk device assigned to the certain DB VOL (if the power of the disk device is already ON, such an instruction need not be especially issued). There are sometimes cases hereinbelow where the power consumption state of the disk device corresponding with the LU 360 is simply the power consumption state of the LU 360. For example, if it is said that the power of the LU 360 is ON, this means that the power of all of the disk devices corresponding with the LU 360 is ON.

Figure 2:
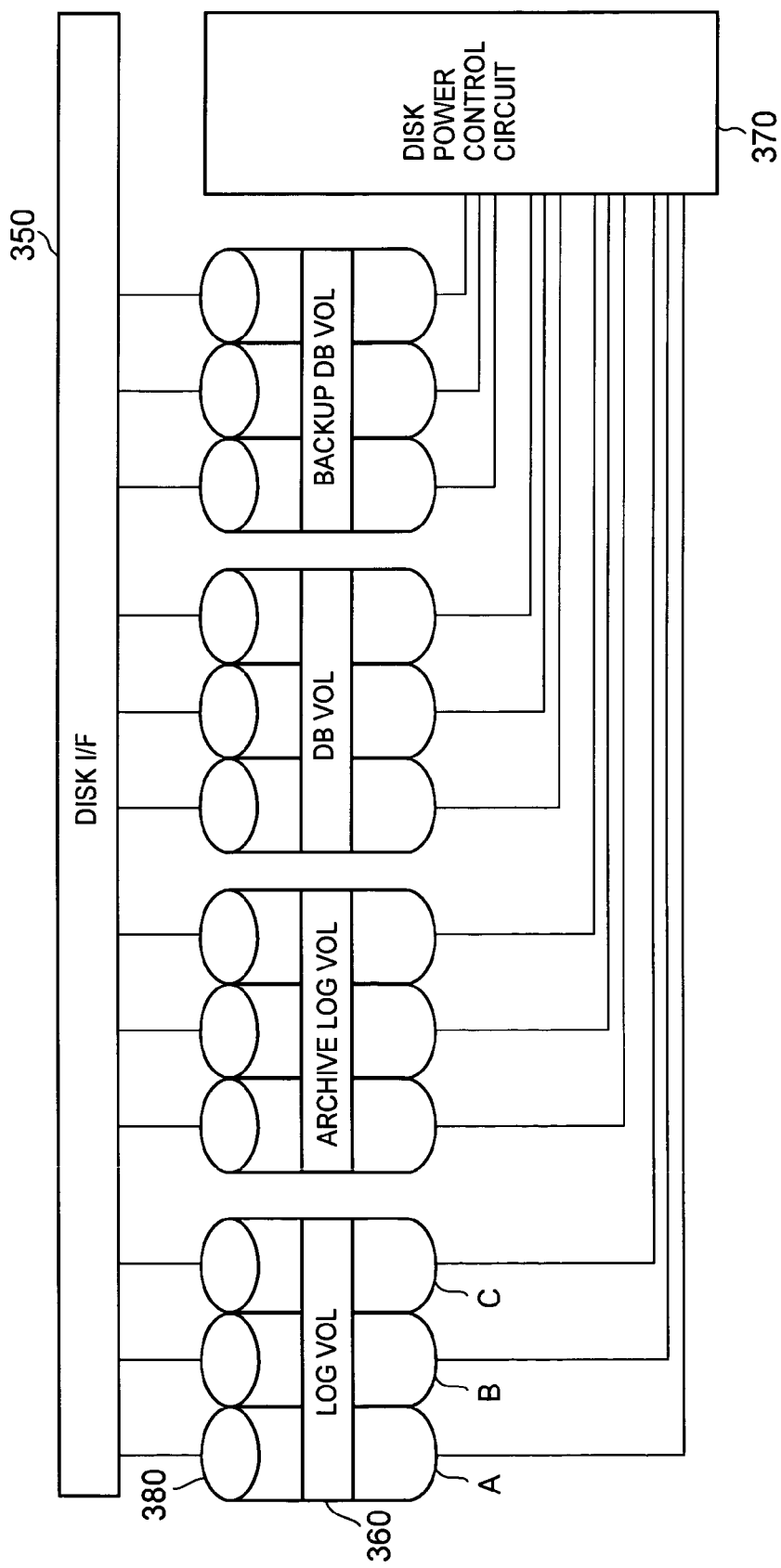
FIG. 2 shows an example of the constitution of an LU and a disk device.

FIG. 2 shows an example of the constitution of the LU 360 and the disk device.

As mentioned earlier, the LU 360 is formed by assigning part or all of the storage space of one or a plurality of disk devices 380. In FIG. 2, the log VOL, archive log VOL, DB VOL, and backup DB VOL are each formed by three disk devices 380. For example, the log VOL is formed by a disk device A, disk device B, and disk device C. With such a constitution, in cases where the power of the log VOL is switched ON, the power control module 323 controls the disk power control circuit 370 so that the power of all of the disk devices A, B and C is turned ON (an instruction to turn ON the power of all of the disk devices A, B and C is sent to the disk power control circuit 370, for example).

Figure 3:
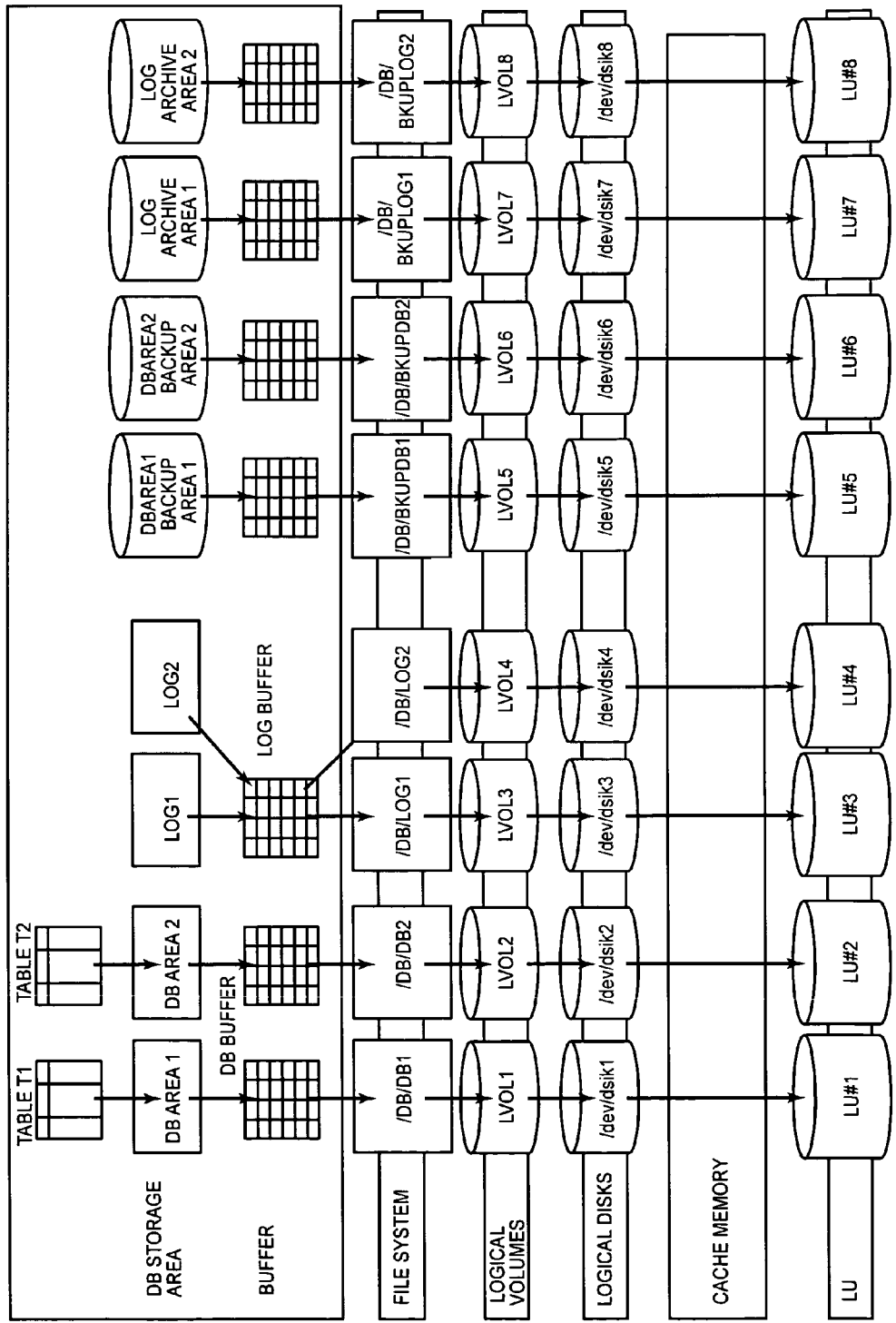
FIG. 3 shows an example of the constitution of the DB access environment.

FIG. 3 shows an example of the constitution of the DB access environment.

FIG. 3 shows eight DB access environments (eight DB access environments including eight DB storage areas which are DBAREA1, DBAREA2, LOG1, LOG2, a backup area 1 for DBAREA1, a backup area 2 for DBAREA2, a log archive area 1 and a log archive area 2).

For example, a DB access environment including a DB storage area (DBAREA1) is utilized to access the DB VOL (LU#1). DB access environments each including a DB storage area (LOG1 and LOG2) are used to access the log VOLs (LU#3 and LU#4) respectively. Further, a DB access environment including the DB storage area (DBAREA1 backup area 1) is used to access the backup DB VOL (LU#5) in which backup data of the DB VOL (LU#1) corresponding with the DB storage area (DBAREA1) are stored. A DB access environment including a DB storage area (log archive area 1) is used to access the archive log VOL (LU#8) in which archive logs of the log VOL (LU#3 or LU#4) are stored.

The number of backup DB VOL corresponding to one DB VOL is a number that corresponds to the number of generations of backups acquired, for example. Hence, for example, first generation backup data of the DB VOL (LU#1) are stored in a first backup DB VOL that corresponds to the DB VOL (LU#1) and second generation backup data are stored in a second backup DB VOL that corresponds to the DB VOL (LU#1).

Log data related to a plurality of DB corresponding to a plurality of DB VOL, for example, are stored in one log VOL (the log VOL and DV VOL may correspond one for one). In addition, the log archive VOL corresponds to an archive generation for the log VOL. Further, for example, the DBMS 121 manages the date and time of each check point. As a result, an archive log VOL that corresponds to an archive generation following the latest check point date and time and an archive log VOL that corresponds to an archive generation between a certain check point date and time and the next check point date and time and so forth can be specified by the DBMS 121.

As shown in FIG. 3, all of the DB access environments are constituted as follows: one buffer (DB buffer 1214 and log buffer 1215 or the like) is associated with one DB storage area; one file is associated with this buffer and one logical volume is associated with one file; one logical disk is associated with one logical volume, and one LU 360 is associated with one logical disk. A buffer as it is called here is a storage area provided in the memory 120 of the host computer 100 in which data (DB data, log data, backup data, or archive log) are temporarily stored.

A common log buffer 1215 may be associated in the DB access environments that are used to access the log data (the respective DB access environments of the DB storage areas (LOG1 and LOG2)), as shown. Thus, in cases where one log buffer 1215 is common to a plurality of DB access environments corresponding with a plurality of log VOL, any one DB access environment among the plurality of DB access environments is selectively utilized (here, the DB access environment including a DB storage area (LOG1) or a DB access environment including a DB storage area (LOG2)). For example, the log VOL which is the usage target is switched with the round robin format. More specifically, for example, when one of two log VOL (LU#3 or LU#4) are full of log data (or when another predetermined condition is met), the usage target log VOL is switched from one log VOL to another log VOL and, when the other log VOL is full of log data, the usage target log VOL is switched from the other log VOL to the first log VOL. Hereinbelow, such log VOL switching (in other words, the switching of DB access environments for accessing the log VOL) is called a swap and processing to perform the swap is called 'log swap processing'. Log swap processing is performed by the DBMS 121.

Incidentally, in the illustrated DB access environment, DB objects (table T1, for example) and logical disks alike are managed within the host computer 100 and the cache memory 330 and LU 360 are managed within the storage system 300. The operating system (OS) of the host computer 100 includes a device manager, volume manager and file system, for example, as a plurality of computer programs (not shown). A logical disk is a logical disk device that is created by the device manager based on the LU 360 provided by the storage system 300. A logical volume is a logical storage resource that is created by a volume manager based on logical disks. A file is a resource that is managed by the file system. A DB storage area is a logical storage area that is managed by the DBMS 121. In addition, in each illustrated DB access environment, a character string (DBAREA1, for example) on a figure representing a DB storage area represents the DB storage area and a character string on a figure representing a file (/DB/DB1, for example) represents a file name and a character string on a figure representing a logical volume (LVOL1, for example) represents a logical volume name and a character string (/dev/dsik1, for example) on a figure that represents a logical disk represents a logical disk name. In addition, a character string on a figure representing a cache partition area (DBBuff1, for example) represents the name of the cache partition area (partition name) and the character string on a figure representing an LU 360 (LU#1, for example) represents an LUN (Logical Unit Number).

The DBMS 121 uses such a DB access environment to access an LU 360 of the storage system 300. For example, the DBMS 121 issues a command to write data to a DB storage area (DBAREA1) when writing data to the LU (LU#1). In this case, the write data are temporarily stored in the DB buffer 1214 that is associated with the DB storage area (DBAREA1) and the write data are transferred to the LU (LU#1) via the file (/DB/DB1) that is associated with the DB buffer 1214, the logical volume (LVOL1) that is associated with the file (/DB/DB1), and the logical disk (/dev/dsik1) that is associated with the logical volume (LVOL1).

FIG. 4 shows an example of the DB disk mapping table 1216.

This table 1216 records the relationships of all or some of the respective environment elements of the DB access environments and the power consumption states for each LU 360. For example, this table 1216 associates and records, for each DB access environment, the DB storage area name 12161, the file name 12162, the type 12163, the storage system ID 12164, the LU ID (LUN, for example) 12165, and the power consumption state 12166. The type 12163 is the type of data handled by the DB access environment. For example, the types 12163 that are recorded are 'DB' for user data, 'log' for log data, 'backup' for backup data, and 'archive log' for archive logs. The storage system ID 12164 is the ID of the storage system 300 comprising the LU 360 indicated by the LU ID 12165. The power consumption state 12166 is information indicating the power consumption state of the disk device 380 corresponding to the LU 360 indicated by the LU ID 12165. For example, the power consumption states 12166 that are recorded include 'ON' where the power of the disk device 380 corresponding to the LU 360 is 'ON' and, conversely, 'OFF' where the power thereof is OFF. The power consumption state 12166 is set by the DBMS 121. For example, the DBMS 121 is able to set the power consumption state 12166 based on the instruction content when the switching of the power consumption state to the disk power control instruction program 122 is instructed (or when notification regarding completion in response to the instruction) (the power consumption state is switched from 'ON' to 'OFF' or from 'OFF' to 'ON', for example).

By referencing this table 1216, the DBMS 121 is able to report the constitution of the DB access environment corresponding to the DB storage area for each DB storage area identified by the DBMS 121. In addition, the DBMS 121 is able to issue, for each DB access environment, notification of the power consumption state of the LU 360 that is accessed when this DB access environment is utilized. Therefore, the DBMS 121 is able to issue notification of which power consumption state the LU 360 is in beforehand when the LU 360 is accessed (whether the power of the LU 360 is ON, for example).

The constitution of the system according to this embodiment was described hereinabove. In this embodiment, in view of the fact that the log VOL which is the current usage target and the DB VOL are substantially frequently accessed, the power consumption states of the DB VOL and current usage target log VOL are, as a general rule, set as power ON states by the DBMS 121. However, because the backup DB VOL and archive log VOL are substantially only accessed at the time of a backup or restore, the power consumption states of the backup DB VOL and archive log VOL are, as a general rule, set as power OFF states by the DBMS 121.

The processing that is executed by the various types of programs 1211, 1212, and 1213 that the DBMS 121 comprises will be described hereinbelow.

Figure 5:
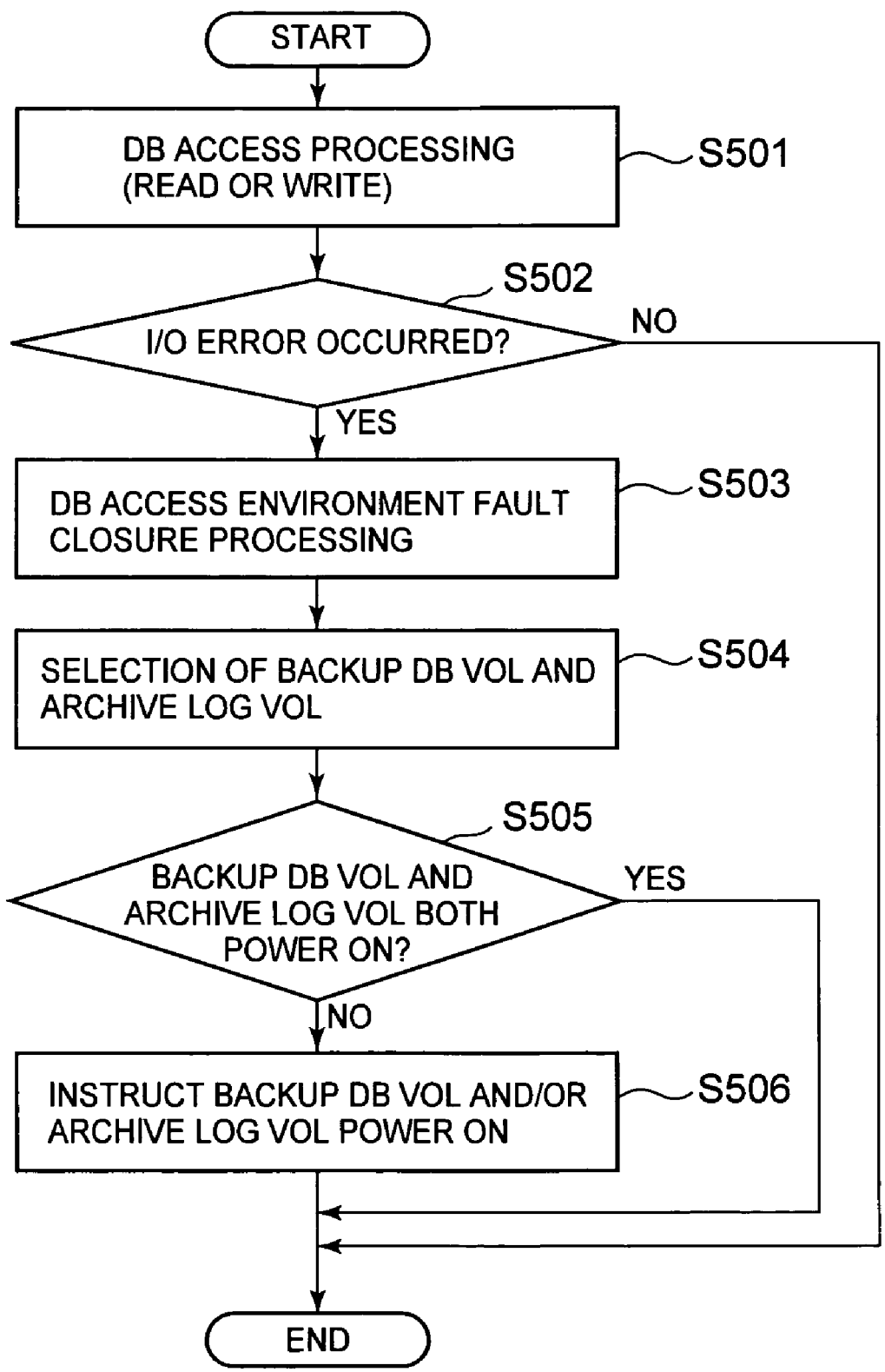
FIG. 5 is a flowchart of processing that is executed by the DB access control module.

FIG. 5 is a flowchart of the processing that is executed by the DB access control module 1211.

First, the DB access control module 1211 performs DB access processing in response to a request from a client computer, for example (or in response to another event) (S501). For example, in cases where the writing of data to a certain DB (a DB that corresponds with a request from the client computer or a DB that corresponds with the generation of another event, for example) is carried out, the DB access control module 1211 stores write data in the DB storage area in order to access this certain DB. In addition, the DB access control module 1211 creates log data for the storage of the write data and stores the log data in the DB storage area corresponding with the log VOL which is the current usage target.

In cases where access processing is performed normally, the data stored in the DB storage area (write data and log data) are stored to the corresponding LU 360 via the DB access environment containing the DB storage area as mentioned earlier. However, in cases where a fault occurs in the environment element constituting the DB access environment, the writing of write data and/or log data to the LU 360 fails. In this case, the DB access control module 1211 then receives an error ('I/O error' hereinbelow) (receives an I/O error from the file system, volume manager, or storage system 300, for example).

The DB access control module 1211 judges whether the access processing of S501 has ended normally (S502). For example, the DB access control module 1211 is able to judge that the access processing has ended normally when a complete notification is received without receipt of an I/O error and judge that the access processing has not ended normally in cases where an I/O error is received.

This processing ends in cases where the access processing has ended normally (S502:NO).

However, when the access processing has not ended normally (S502:YES), the fault closure processing is performed for the DB storage area for which an I/O error was produced (S503). More specifically, for example, the DB access control module 1211 registers the fact that the DB storage area cannot be utilized and subsequently does not execute access with respect to that DB storage area.

Thereafter, the selection of the backup DB VOL and archive log VOL that are used in order to restore the data of the DB VOL which is the access destination in S501 is carried out (S504). For example, in cases where the fault closure processing is carried out for the DB storage area (DBAREA1), a specified (the latest, for example) backup generation LU (LU#5) that corresponds to the DB storage area (DBAREA1 backup area 1) is selected as the backup DB VOL used for the restore. In addition, the LU 360 in which the specified (the latest, for example) archive generation archive log is stored as the archive log VOL used for a restore is selected. More specifically, for example, if the archive generation of the archive log that is stored in the LU (LU#8) is newer than the archive log that is stored in the LU (LU#7) in FIG. 3, the LU (LU#8) is selected as the archive log VOL used for the restore. Information representing the relationship between the backup VOL and backup generation, information representing the relationship between the archive VOL and archive generation, and information representing which archive log of which archive generation is required to restore the DB corresponding with the backup generation is managed by the DBMS 121, for example.

Thereafter, the DB access control module 1211 references the DB disk mapping table 1216 and thus judges whether the power consumption states of both the backup DB VOL and archive log VOL selected in S504 are power ON (S505). For example, when the LU (LU#5) is selected as the backup DB VOL and the LU (LU#8) is selected as the archive log VOL, if the DB disk mapping table 1216 is as shown in FIG. 4, the power consumption states 12166 of the respective LU (LU#5) and LU (LU#8) are also both OFF. Hence, it can be seen that the respective power consumption states of the backup DB VOL and archive log VOL selected in S504 are both power OFF.

In cases where the power consumption states of the backup DB VOL and archive log VOL selected in S504 are power ON (S505:YES), this processing ends.

However, in cases where both or one of the backup DB VOL and archive log VOL selected in S504 are power OFF (S505: NO), the power consumption state of the backup DB VOL and/or archive log VOL for which the power is OFF are switched to power ON (S506). For example, the DB access control module 1211 issues a power ON instruction to the disk power control instruction program 122 in cases where the power consumption states of the LU (LU#5) and LU (LU#8) are switched to power ON. When this instruction is issued, for example, the combination of the storage system ID and LU ID ('CTL#A1' and 'LU#5' and 'CTL#A1' and 'LU#8', for example) are designated. Further, the disk power control instruction program 122, which receives the power ON instruction, transmits a power ON instruction that designates the designated LU ID in the storage system identified from the designated storage system ID to the power control module 323 of the storage system 300. The power control module 323 instructs the disk power control circuit 370 to turn ON the power of the LU (LU#5) and (LU#8) designated by the power ON instruction in accordance with the power ON instruction. More specifically, for example, the power control module 323 references constitution information (not shown) that is stored in the memory 320 (information on which LU are formed based on which RAID groups and on which RAID group is constituted by which disk devices 380, for example), specifies the disk devices 380 corresponding which the designated 'LU#5' and 'LU#8', and instructs the disk power control circuit 370 to turn ON the power of the specified disk device 380. The disk power control circuit 370 turns ON the power of the disk device 380 designated by the power control module 323 in response to the instruction. Further, a RAID (Redundant Array of Independent (or Inexpensive) Disks) group is a group constituted by two or more disk devices 380 which corresponds with a predetermined RAID level, which is also known as an array group or a parity group.

A flowchart for the processing executed by the DB access control module 1211 was provided hereinabove.

Figure 6:
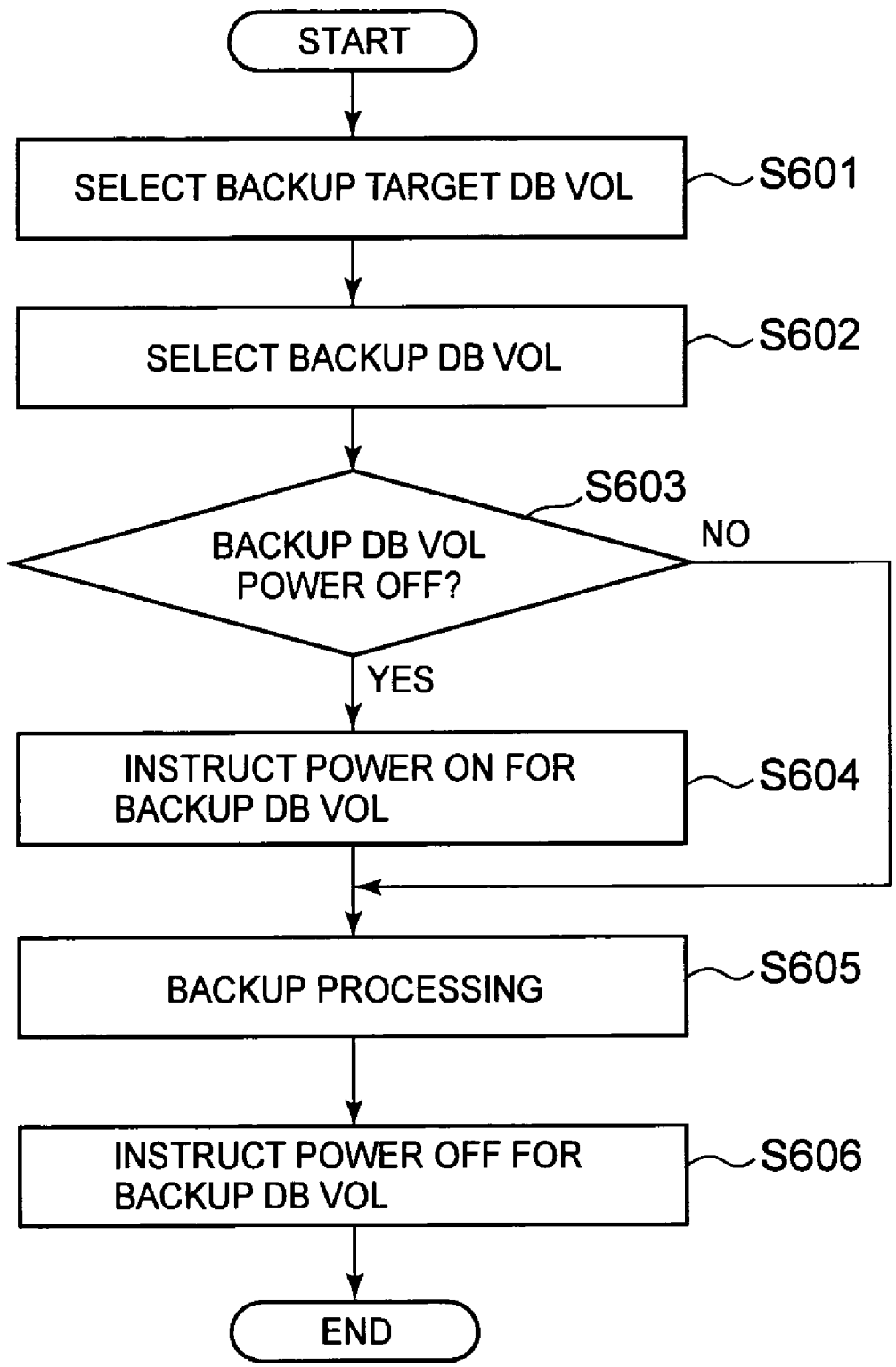
FIG. 6 is a flowchart of processing that is executed by a backup processing module.

FIG. 6 is a flowchart for processing that is executed by the backup processing module 1212.

First, the backup processing module 1212 receives a selection of a backup target DB VOL (S601). For example, the system administrator is able to select the backup-target DB VOL via a user interface that is provided by the backup processing module 1212.

Thereafter, the backup processing module 1212 selects a backup DB VOL for storing backup data of a DB VOL selected in S601 (S602). For example, in cases where the LU (LU#1) is selected as the DB VOL in S601, the latest backup generation backup DB VOL (LU#5) that corresponds with the LU (LU#1) is selected (the information representing the relationship between the DB VOL and backup DB VOL is managed by the DBMS 121, for example). S602 and previous processing may also be performed when a backup is indicated as a result of the system administrator selecting the backup generation DB VOL (immediately after S601) or may be started when the system administrator sets information indicating the opportunity to start a backup in conjunction with the selection of a backup target DB VOL in S601.

Thereafter, the backup processing module 1212 references the DB disk mapping table 1216 and thus judges whether the power consumption state of the backup DB VOL selected in S602 is in the power ON state (S603). In cases where the backup DB VOL (LU#5) is selected in S602, for example, if the DB disk mapping table 1216 is as shown in FIG. 4, the power consumption state 12166 of the backup VOL (LU#5) is 'OFF'. Hence, it can be seen that the power consumption state of the backup DB VOL (LU#5) is power OFF.

In cases where the power consumption state of the backup DB VOL selected in S602 is power ON (S603:NO), this processing moves on to S605.

In cases where the power consumption state of the backup DB VOL selected in S602 is power OFF (S603: YES), the power consumption state of the backup DB VOL is switched to power ON (S604). The switching of the power consumption state is performed using the same method as that for S506 in FIG. 5.

Thereafter, the backup processing module 1212 performs a backup of the selected DB VOL data (S605). In other words, the backup processing module 1212 reads the data of the backup target DB VOL and writes the data thus read to the corresponding backup DB VOL. For example, in cases where the DB VOL (LU#1) and backup VOL (LU#5) are selected, the backup processing module 1212 utilizes the DB access environment of the DB storage area (DBAREA1) to read the data from the DB VOL (LU#1) and uses the DB access environment of the DB storage area (DBAREA1 backup area 1) to write the data thus read to the backup DB VOL (LU#5).

Thereafter, the backup processing module 1212 switches the power consumption state of the backup DB VOL in which the backup data are stored to power OFF in S605 (S606). More specifically, for example, the backup processing module 1212 issues an instruction to turn the power OFF to the disk power control instruction program 122 in cases where the power consumption state of the backup DB VOL (LU#5) is switched to power OFF. When this instruction is issued, a combination of the storage system ID and LU ID ('CTL#A1' and 'LU#5', for example) is designated, for example. Further, the disk power control instruction program 122 that receives the power OFF instruction transmits a power OFF instruction designating the designated LU ID for the storage system identified from the designated storage system ID to the power control module 323 of the storage system 300. The power control module 323 instructs the disk power control circuit 370 to turn OFF the power of the LU (LU#5) designated by the power OFF instruction in accordance with the power OFF instruction. More specifically, for example, the power control module 323 references the constitution information (not illustrated) that is stored in the memory 320, specifies the disk device 380 that corresponds with the designated 'LU#5', and instructs the disk power control circuit 370 to turn OFF the power of the specified disk device 380. The disk power control circuit 370 turns OFF the power of the disk device 380 designated by the power control module 323 in response to the instruction.

A flowchart for the processing that is executed by the backup processing module 1212 was described hereinabove.

Figure 7:
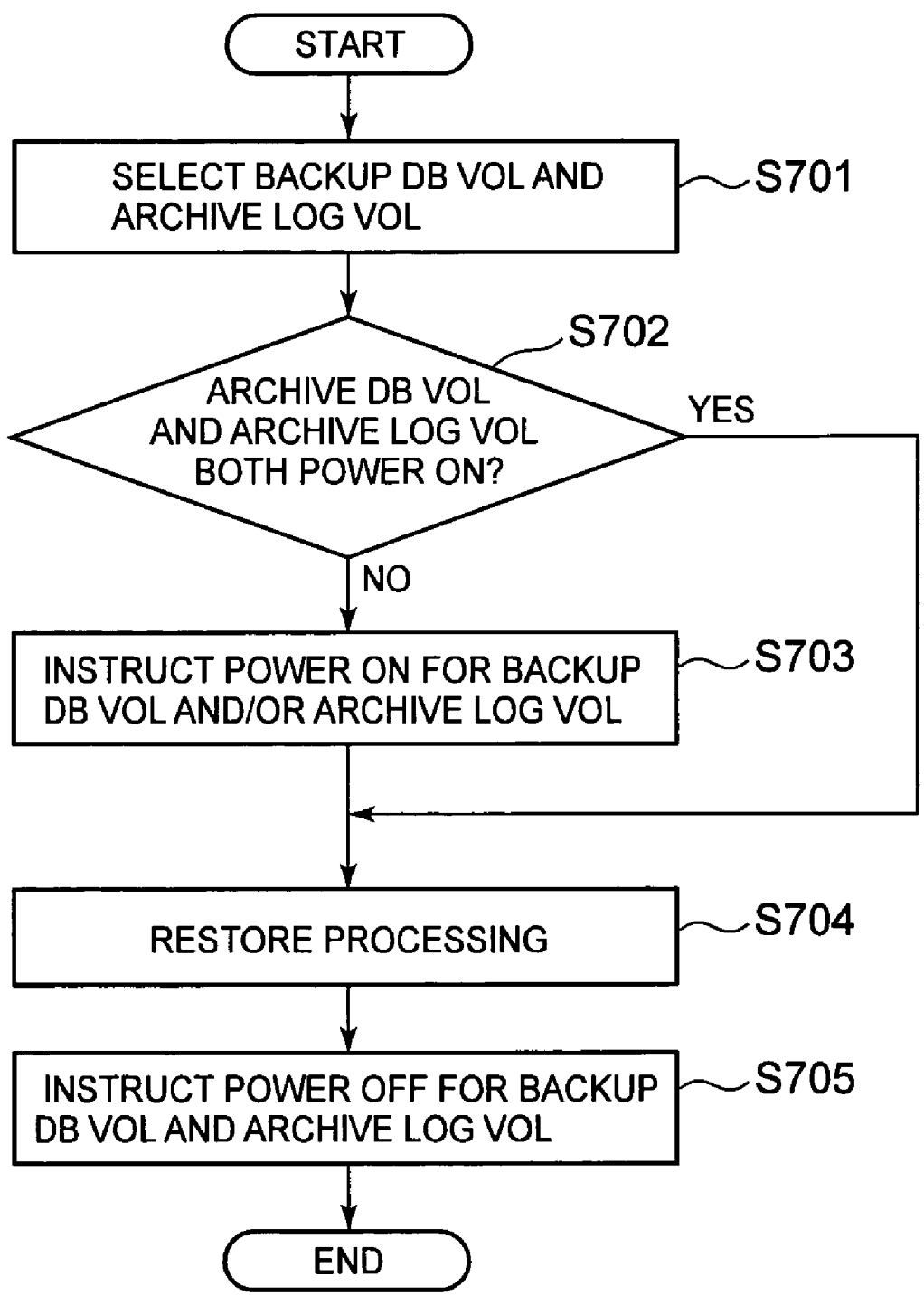
FIG. 7 is a flowchart of processing that is executed by a restore processing module.

FIG. 7 is a flowchart for the processing that is executed by the restore processing module 1213.

First, the restore processing module 1213 receives a restore instruction from the system administrator. For example, the restore instruction designates the storage system ID and LU ID corresponding with the LU of the storage system constituting the DB restore destination (the restore target DB VOL, for example) and designates which DB at which time to restore. The restore processing module 1213 selects the backup DB VOL of the backup generation corresponding to the designated time (that is, the backup generation used for the restore) based on the restore instruction and the archive log VOL in which the log data required for the DB restore at that time are stored (S701).

Thereafter, the restore processing module 1213 references the DB disk mapping table 1216 and thus judges whether the power consumption states of both the backup DB VOL and archive log VOL selected in S701 are power ON (S702).

In cases where the power consumption states of both the backup DB VOL and archive log VOL are power ON (S702: YES), the processing moves to S704.

In cases where the power consumption states of either the backup DB VOL or archive log VOL, or both of them are power OFF (S702:NO), the power consumption states of the backup DB VOL and/or archive log VOL for which the power is OFF are switched to power ON (S703).

Thereafter, the restore processing module 1213 performs restore processing in accordance with the restore instruction (S704). In other words, the restore processing module 1213 reads the backup data from the selected backup DB VOL and the archive log from the archive log VOL and writes the backup data to the restore destination LU on the basis of the archive log. As a result, the DB at the designated time is restored to the LU.

Thereafter, the restore processing module 1213 switches the power consumption states of the backup log VOL and archive log VOL used for the restore to power OFF (S705).

The flowchart of the processing executed by the restore processing module 1213 was described hereinabove.

Figure 8:
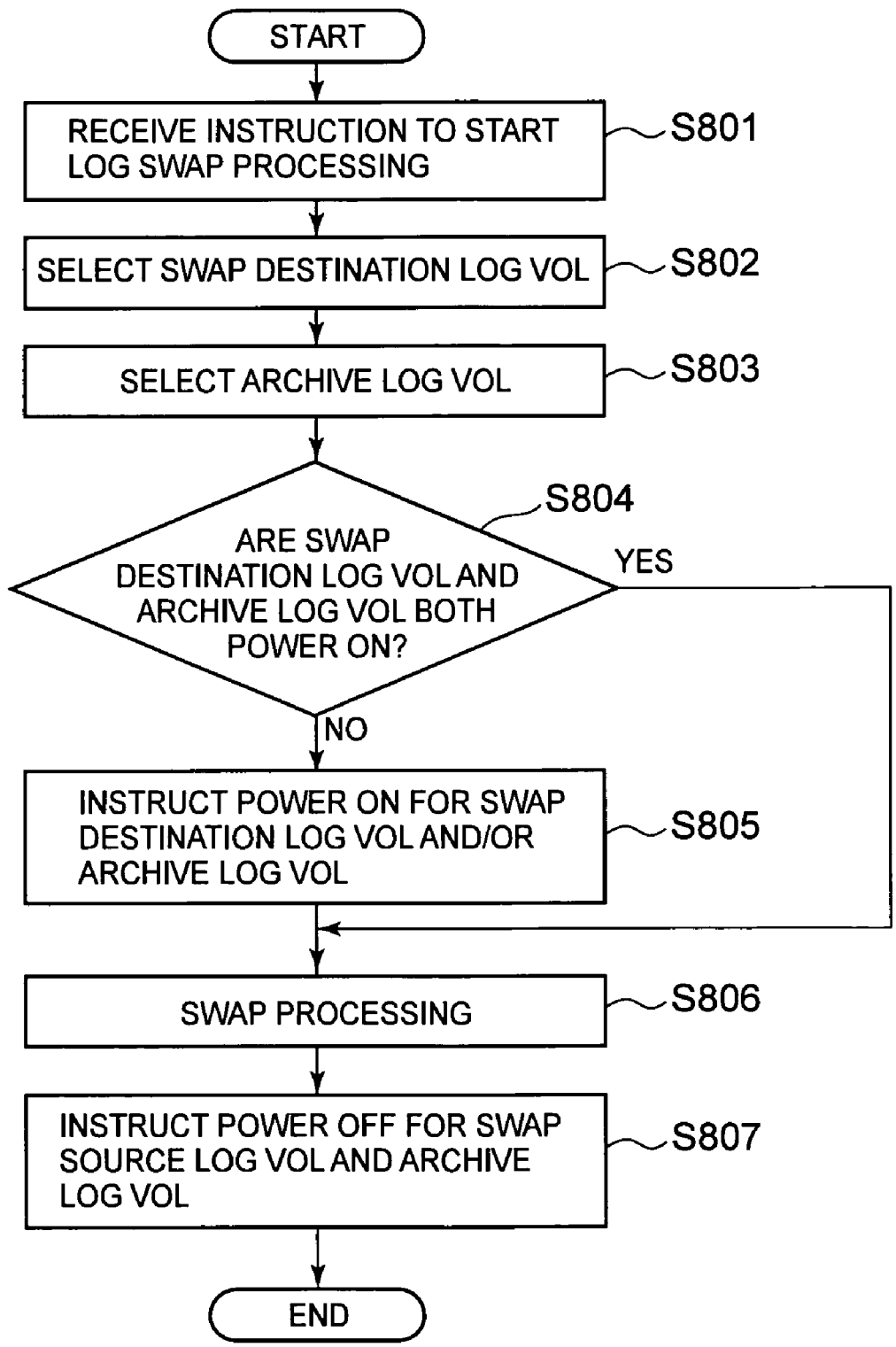
FIG. 8 is a flowchart for log-swap processing that is executed by a DBMS.

FIG. 8 is a flowchart of log swap processing that is executed by the DB access control module 1211.

First, the DB access control module 1211 receives an instruction to start the log swap processing (S801).

The DB access control module 1211 that received the instruction to start the log swap processing selects the swap destination log VOL, that is, the log VOL that will be used after the log swap processing is complete (S802). For example, the DB access control module 1211 selects the swap destination log VOL by means of the so-called round robin system. More specifically, for example, in cases where the LU ID of the log VOL currently being used (swap source log VOL) is 'LU#3', the DB access control module 1211 selects the log VOL with the LU ID 'LU#4' obtained by adding one to the LU ID of the swap source VOL as the swap destination log VOL.

Thereafter, the DB access control module 1211 selects the archive log VOL constituting the storage destination of the log data (archive log) stored in the swap source log VOL (S803).

The DB access control module 1211 then references the DB disk mapping table 1216 to judge whether the power consumption states of both the swap destination log VOL and archive log VOL selected in S802 and S803 respectively are power ON (S804).

In cases where the power consumption states of both the swap destination log VOL and archive log VOL are power ON (S804: YES), the processing moves on to S806.

In cases where both or either one of the power consumption states of the swap destination log VOL and archive log VOL are power OFF (S804:NO), the power consumption states of the log VOL and/or archive log VOL for which the power is OFF are switched to power ON (S805).

Thereafter, the DB access control module 1211 performs log swap processing. That is, the DB access control module 1211 switches the DB access environment used to access the log data from the DB access environment that corresponds with the log VOL of the swap source (LU(LU#3), for example) to the access environment that corresponds with the log VOL (LU(LU#4), for example) of the swap destination and switches the usage target log VOL from the swap source log VOL to the swap destination log VOL. Further, the DB access control module 1211 reads the archive log from the swap source log VOL and writes the archive log to the archive log VOL that was selected in S803.

Thereafter, the DB access control module 1211 switches the power consumption states of the swap source log VOL and the archive log VOL in which the archive log is stored in S806 to power OFF (S807).

The flowchart for the log swap processing was described hereinabove. From the perspective of rapidly switching the usage target log VOL, the power consumption state of the log VOL constituting the swap destination in the subsequent log swap processing may be set to power ON during the interval extending from the log VOL switching completion time of the current log swap processing until before the start of the subsequent log swap processing. More specifically, the power consumption state of the log VOL which is the swap destination may also be set to power ON in the subsequent log swap processing, for example, upon completion of the switching of the log VOL in the current log swap processing or when there is a certain volume of log data in the swap destination log VOL in the current log swap processing (the log VOL which will become the swap source in the subsequent log swap processing) (in cases where the consumed storage capacity or storage capacity consumption rate of the log VOL exceeds a predetermined threshold value, for example).

According to this embodiment, the DBMS 121 manages which of the LU 360 that exist in the storage system 300 are used in which applications (DB VOL, log VOL, backup DB VOL, archive log VOL), for example) and also what kind of power consumption states each of the LU 360 are in. Hence, the DBMS 121 is able to learn the power consumption states of the respective LU 360. As a result, when a fault occurs, the power consumption states of the backup VOL and archive log VOL that are used for a restore can be set to power ON in advance. Therefore, the start of a restore due to the startup of the disk device 380 is no longer to be expected and, consequently, a restore can be started early.

Second Embodiment

The second embodiment of the present invention will be described next. Here, the differences from the first embodiment will mainly be described and a description of points in common with the first embodiment is omitted or simplified.

Figure 9:
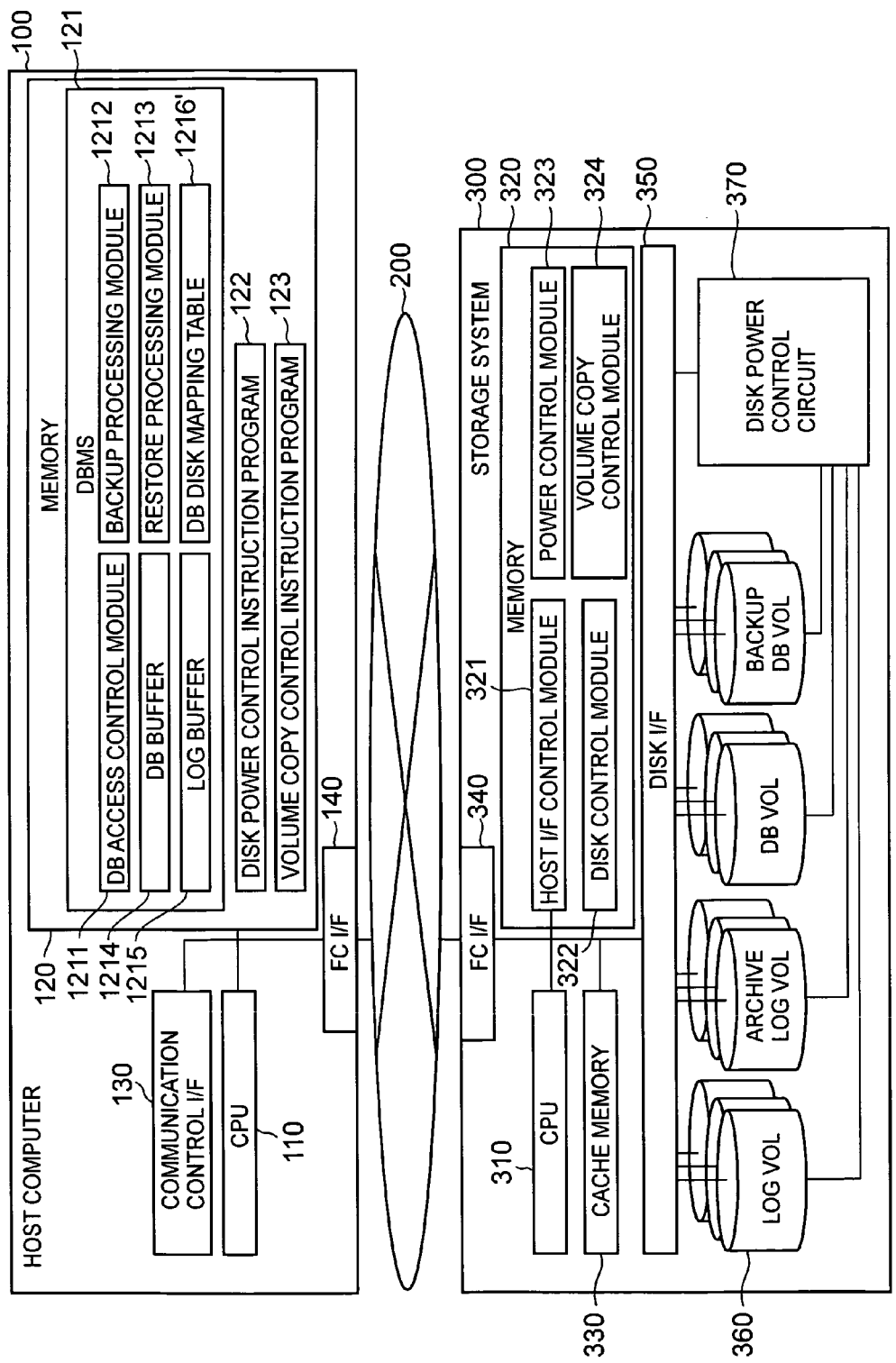
FIG. 9 shows an example of the constitution of the whole system according to a second embodiment of the present invention.

FIG. 9 shows an example of the constitution of the whole system according to a second embodiment of the present invention.

In this embodiment, the storage system 300 forms a pair of LU 360 (copy pair). One LU 360 (primary VOL) of the copy pair stores user data such as the DB VOL above. The other LU 360 (secondary VOL) stores a copy of the data of the paired primary VOL.

The memory 320 of the storage system 300 also stores a volume copy control module 324. The volume copy control module 324 is a program that makes a copy of data from the primary VOL to the secondary VOL ('inter-VOL copy' hereinbelow). The volume copy control module 324 executes an inter-VOL copy in accordance with an instruction from a volume copy control instruction program 123 (described subsequently) of the host computer 100.

The memory 120 of the host computer 100 also stores the volume copy control instruction program 123. The volume copy control instruction program 123 issues an inter-VOL copy instruction to the volume copy control module 324 of the storage system 300 in accordance with an instruction from the backup processing module 1212.

The backup processing module 1212 of the host computer 100 issues an inter-VOL copy instruction to the volume copy control program 123 instead of performing the above processing (the processing in which the backup processing module 1212 itself reads the backup data from a predetermined DB VOL and writes same to a predetermined backup DB VOL) when performing a data backup. The details of the processing that is executed by the backup processing module 1212 of this embodiment will be described subsequently.

FIG. 10 shows an example of a DB disk mapping table 1216' of this embodiment.

This table 1216' records a primary storage system ID 12167, a primary LU ID 12168, a secondary storage system ID 12169, and a secondary LU ID 12160 instead of the storage system ID 12164 and LU ID 12165 of the table 1216 of FIG. 4. The primary LU ID 12168 is the ID of the primary VOL. The secondary LU ID 12160 is the ID of the secondary VOL. The primary storage system ID 12167 is the ID of the storage system 300 that comprises a primary VOL that is indicated by the primary LU ID 12168. The secondary storage system ID 12169 is the ID of the storage system 300 that comprises the secondary VOL indicated by the secondary LU ID 12160. The power consumption state 12166 of this table 1216' records the power consumption state of the secondary VOL that is indicated by the secondary LU ID 12160.

By referencing this table 1216', the DBMS 121 is able to learn the power consumption state of the secondary VOL and the relationship between the primary VOL and secondary VOL in addition to learning the constitution of the DB access environment as in the case of table 1216 of FIG. 4. Therefore, the DBMS 121 is able to learn in advance the power consumption state of the secondary VOL that is used to store the copy when a backup of the data of the primary VOL is made.

The constitution of the system of this embodiment was described hereinabove. The processing that is executed by the DBMS 121 of this embodiment will be described hereinbelow.

The processing that is executed by the DB access control module 1211 is substantially the same as that shown in FIG. 5 save for the following points. In other words, in this embodiment, the 'backup DB VOL' of S504 to S506 becomes the 'secondary VOL corresponding with the primary VOL'.

Figure 11:
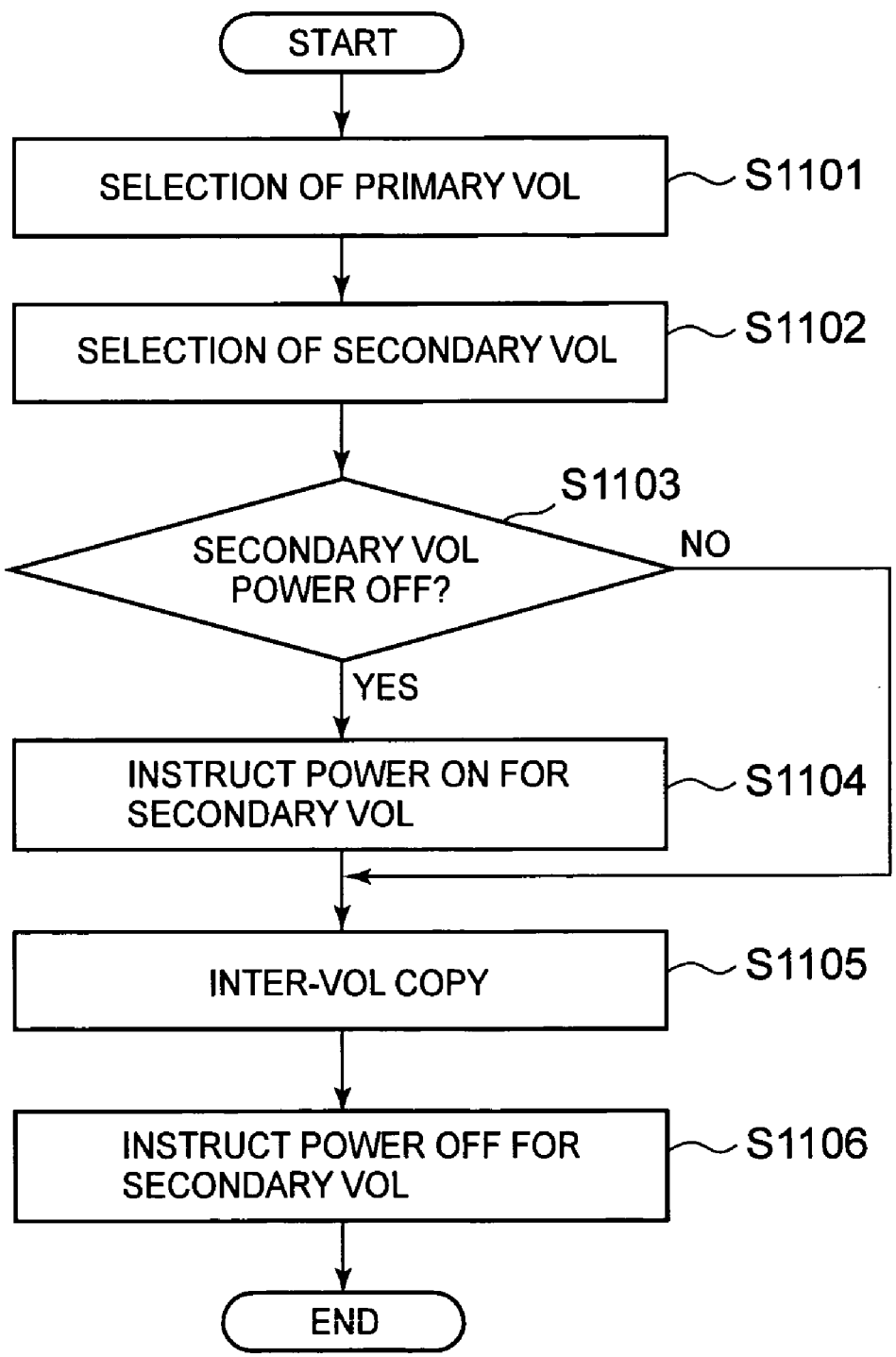
FIG. 11 is a flowchart of processing that is executed by the backup processing module of the second embodiment.

FIG. 11 is a flowchart of the processing that is executed by the backup processing module 1212 of this embodiment.

First, the backup processing module 1212 receives a selection for the backup target primary VOL (S1101). For example, the system administrator is able to select the backup target primary VOL via the user interface that is provided by the backup processing module 1212.

Thereafter, the backup processing module 1212 references the DB disk mapping table 1216' and thus selects a secondary VOL that stores the copy data of the primary VOL selected in S1101 (S1102). For example, in cases where the LU (LU#1) is selected as the primary VOL in S1101, if the DB disk mapping table 1216' is as shown in FIG. 10, the LU (LU#11) that corresponds with the LU (LU#1) is selected as the secondary VOL. As in the case of the processing of FIG. 6, the processing of S1102 and subsequent processing may also be performed when a backup is indicated as a result of the system administrator selecting the backup target primary VOL (immediately after S1101) or may be started when the system administrator sets information indicating the opportunity to start a backup in conjunction with the selection of a backup target primary VOL in S1101.

Thereafter, the backup processing module 1212 references the DB disk mapping table 1216' and thus judges whether the power consumption state of the secondary VOL selected in S1102 is in the power ON state (S1103). In cases where the LU (LU#11) is selected as the secondary VOL in S1102, for example, if the DB disk mapping table 1216 is as shown in FIG. 10, the power consumption state 12166 of the LU (LU#11) is then 'ON'. Hence, it can be seen that the power consumption state of the secondary VOL is power ON.

In cases where the power consumption state of the secondary VOL is power ON (S1103:NO), this processing moves on to S1105.

In cases where the power consumption state of the secondary VOL is power OFF (S1103:YES), the power consumption state of the secondary VOL is switched to power ON (S1104).

Thereafter, the backup processing module 1212 performs an inter-VOL copy from the primary VOL selected in S1101 to the secondary VOL selected in S1102 (S1105).

Thereafter, the backup processing module 1212 switches the power consumption state of the secondary VOL in which the copy is stored to power OFF in S1105 (S1106).

A flowchart for the processing that is executed by the backup processing module 1212 of this embodiment was described hereinabove.

Third Embodiment

The third embodiment can be produced in combination with either of the first and second embodiments. According to the third embodiment, a plurality of LU are formed as one RAID group. The types of LU can be broadly classified as DB VOL and log VOL which are LU of a type where access occurs frequently ('normally accessed LU' hereinbelow) and backup DB VOL and archive log VOL which are LU of a type that is used for backups ('backup LU' hereinbelow). However, it is important to note that, in the third embodiment, although LUs of the same type are allowed to exist in one RAID group as shown in FIG. 12A, the existence of LUs of different types is prohibited as shown in FIG. 12B. This is because there is substantially no switching to power OFF for the disk devices constituting a RAID group with normally accessed LU and, therefore, when disk devices that constitute backup LU and normally accessed LU are common to a RAID group, it is not possible to implement power conservation for the disk devices constituting backup LU. Such LU types are managed by the DBMS 121 and, therefore, control of the combination of such LU types can be executed by DBMS 121.

In addition, according to the third embodiment, when a power OFF instruction is issued, it is judged whether the power of the disk device 380 constituting the designated LU can be turned OFF by the DBMS 121 (the backup processing module 1212 or restore processing module 1213 that issues a power OFF instruction, for example) or by the power control module 323, as shown in S1200 of FIG. 13. If it judged that the power can indeed be turned OFF, a power OFF instruction is transmitted by the DBM 121 or the power OFF of the disk device 380 is executed by the power control module 323 in response to the power OFF instruction (S1201). If it is judged that the power cannot be turned OFF, a power OFF instruction is not transmitted by the DBMS 121 or a response representing the fact that power OFF cannot be executed is transmitted from the power control module 323 to the DBMS 121 (S1202). Cases where it is judged that power OFF is impossible include, for example, a case where a power ON instruction for another LU that exists in the RAID group in which the power OFF target LU exists is issued, where backup processing is underway, or where restore processing is taking place. The processing of FIG. 13 can be performed in S605 of FIG. 6 and S705 of FIG. 7 in cases where the processing is carried out by the DBMS 121, for example. In addition, the information representing which LU exists in which RAID group may also be managed by the DBMS 121.

Although a few embodiments of the present invention were described hereinabove, these embodiments merely serve to illustrate the present invention and are not intended to limit the scope of the present invention to these embodiments alone. The present invention can also be implemented in a variety of other aspects.

For example, the power consumption state instructions (power ON instruction, power OFF instruction, for example) may also flow through the same communication network as the communication network through which the I/O commands transmitted from the host computer 100 flow (the SAN 200, for example) or may flow through a different communication network (a LAN (Local Area Network), for example).

In addition, instead of a power OFF instruction, for example, an instruction for a transition to a power conservation state of another type such as a spin-down instruction which is an instruction to reduce the speed of the disk to below the speed permitting access, for example, may also be adopted. Further, instead of a power ON instruction, another type of power conservation cancellation instruction such as a spin-up instruction, which is an instruction to raise the speed of a power saving disk above the speed permitting access, for example, may also be adopted.

Furthermore, for example, power OFF may be controlled by the storage system 300 or power ON may be controlled by the DBMS 121. In other words, the DBMS 121 may be constituted to issue a power ON instruction but not issue a power OFF instruction (for example, the power control module 323 of the storage system 300 may also issue the power ON instruction in cases where the power of a disk device of the LU 360 that has not been accessed for a fixed time since being accessed the last time is OFF and the DBMS 121 detects an I/O error as mentioned earlier).

Moreover, S704 may also be immediately executed following S506 in FIG. 5, for example, by using the backup DB VOL and archive log VOL whose power are ON as a result of S506. In this case, the LU constituting the restore destination in S704 can be made the predetermined LU.

What is claimed is:

1. A database management system that runs on a computer coupled to a storage system, wherein the storage system includes
a plurality of storage devices,
a power control module that performs power control of the plurality of storage devices, and
an interface module that receives a power conservation instruction from the computer and transfers the power conservation instruction to the power control module,
wherein the database management system comprises:
an access module that performs access of data stored in a first type storage device among the plurality of storage devices and detects a fault relating to the access;
a storage device specifying module that specifies a second type storage device, among the plurality of storage devices, that stores a backup corresponding to the data that are stored in the first type storage device when the access module detects a fault relating to the access of the data; and
a power consumption control module that issues a power conservation cancellation instruction to cancel the power conservation for the specified second type storage device to the interface module of the storage system.

2. The database management system according to claim 1, wherein
the first type storage device includes a DB storage device for storing DB data which are elements constituting the database; and
the second type storage device includes a backup DB storage device which is a backup destination for the DB data in the DB storage device.

3. The database management system according to claim 2, wherein
the first type storage device further includes a log storage device that stores log data which represent a log relating to access to the database; and
the second type storage device further includes an archive log storage device in which an archive of log data that are stored in the log storage device is stored.

4. The database management system according to claim 3, wherein
a plurality of log storage devices are associated with log buffer provided in a storage resource in the computer,
the database management system further comprising:
a log swap module that executes swap processing that includes processing to swap a target log storage device which is an access destination for log data stored in the log buffer from a first log storage device to a second log storage device among the plurality of log storage devices and processing to write the log data stored in the first log storage device to the archive log storage device, and wherein the access module is constituted to temporarily store the log data in the log buffer and store the log data which are stored in the log buffer in the target log storage device, and the power consumption control module issues a power conservation cancellation instruction to cancel the power conservation of the second log storage device and the archive log storage device before the start of the swap processing.

5. The database management system according to claim 4, wherein, prior to the start of subsequent swap processing, the power consumption control module issues a power conservation cancellation instruction to cancel power conservation of the storage device which is the second type storage device in the subsequent swap processing following the current swap processing.

6. The database management system according to claim 2, further comprising a backup module that backs up data that are stored in the DB storage device to a backup DB storage device that is selected from the plurality of storage devices, wherein the power consumption control module issues a power conservation cancellation instruction to cancel the power conservation of the backup DB storage device prior to the start of the backup of data from the DB storage device to the backup storage device and issues a power conservation instruction to conserve the power of the backup DB storage device after the backup is complete.

7. The database management system according to claim 6, wherein the plurality of storage devices are each logical storage devices that are formed on a RAID group constituted by two or more physical storage devices; and the power consumption control module does not issue a power conservation instruction to the backup DB logical storage device if the power conservation of another logical storage device that exists in the RAID group in which the backup DB logical storage device exists cannot be canceled.

8. The database management system according to claim 2, further comprising a restore module that restores a database using data that are stored in a backup DB storage device that is selected from the plurality of storage devices, wherein the power consumption control module issues a power conservation instruction to conserve the power of the backup DB storage device after a restore that utilizes the data stored in the backup DB storage device is complete.

9. The database management system according to claim 8, wherein the selected backup DB storage device in which the data read during the restore are stored is a backup DB storage device which constitutes a target of the power conservation cancellation due to a power conservation cancellation instruction that is issued by the power consumption control module.

10. The database management system according to claim 8, wherein the plurality of storage devices are each logical storage devices that are formed on a RAID group constituted by two or more physical storage devices, and the power consumption control module does not issue a power conservation instruction to the backup DB logical storage device if the power conservation of another logical storage device that exists in the RAID group in which the backup DB logical storage device exists cannot be canceled.

11. The database management system according to claim 1, wherein the plurality of storage devices are each logical storage devices that are formed on a RAID group constituted by two or more physical storage devices, and the first type storage device and second type storage device are not mixed as the two or more storage devices that exist in one RAID group.

12. The database management system of claim 1, wherein when the access module detects a fault relating to the access of the data, the access module performs fault closure processing for a storage area for which the fault was produced.

13. A computer system, comprising:

a storage system comprising a plurality of storage devices, a power control module, and an interface module; and a computer comprising a database management system, wherein the computer comprises:

an access module that performs access of data stored in a first type storage device among the plurality of storage devices and detects a fault relating to the access;

a storage device specifying module that specifies a second type storage device, among the plurality of storage devices, that stores a backup corresponding to data that are stored in the first type storage device when the access module detects a fault relating to the access of the data; and a power consumption control module that issues a power conservation cancellation instruction for canceling the power conservation of the specified second type storage device to the interface module of the storage system, and wherein:

the interface module receives the power conservation cancellation instruction and transfers the power conservation cancellation instruction to the power control module; and the power control module cancels, in response to the power conservation cancellation instruction, the power conservation of the second type storage device specified by the power conservation cancellation instruction.

14. The computer system according to claim 13, wherein the plurality of storage devices are each logical storage devices that are formed on a RAID group constituted by two or more physical storage devices, the power conservation cancellation instruction is designated by the logical storage device, and the power control module cancels the power conservation of all of the physical storage devices pertaining to the logical storage devices designated by the power conservation cancellation instruction.

15. A computer that executes a database management system coupled to a storage system, wherein the storage system includes a plurality of storage devices, a power control module that performs power control of the plurality of storage devices and an interface module that receives a power conservation instruction and transfers the power conservation instruction to the power control module, the computer comprising:

an access module that performs access of data stored in a first type storage device among the plurality of storage devices and detects a fault relating to the access;

a storage device specifying module that specifies a second type storage device, among the plurality of storage devices, that stores a backup corresponding to data that are stored in the first type storage device when the access module detects a fault relating to the access of the data; and a power consumption control module that issues a power conservation cancellation instruction to cancel the power conservation for the specified second type storage device to the interface module of the storage system.

16. A power control method that is executed by a computer system having:

a storage system having a plurality of storage devices, a power control module and an interface module; and a computer having a database management system, the method comprising:

a step in which the database management system performs access of data stored in a first type storage device among the plurality of storage devices and, when a fault relating to the access is detected, specifies a second type storage device among the plurality of storage devices that stores a backup corresponding to the data that are stored in the first type storage device;

a step in which the computer issues a power conservation cancellation instruction to cancel the power conservation of the specified second type storage device;

a step in which the interface module of the storage system receives the power conservation cancellation instruction from the computer and transfers the power conservation cancellation instruction to the power control module of the storage system;

a step in which the power control module of the storage system cancels the power conservation of the second type storage device specified by the power conservation cancellation instruction.

* * * * *